United States Patent
Jain et al.

(10) Patent No.: US 12,052,328 B2
(45) Date of Patent: *Jul. 30, 2024

(54) DERIVING PROXY STABILITY WITHOUT NETWORK INSPECTION

(71) Applicant: BrowserStack Limited, Dublin (IE)

(72) Inventors: Bipul Jain, Mumbai (IN); Yohan Pereira, Maharashtra (IN)

(73) Assignee: BrowserStack Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,782

(22) Filed: Sep. 29, 2022

(65) Prior Publication Data

US 2023/0239375 A1 Jul. 27, 2023

Related U.S. Application Data

(63) Continuation of application No. 17/586,766, filed on Jan. 27, 2022, now Pat. No. 11,470,183.

(51) Int. Cl.
*H04L 67/60* (2022.01)
*H04L 12/46* (2006.01)

(52) U.S. Cl.
CPC .......... *H04L 67/60* (2022.05); *H04L 12/4633* (2013.01)

(58) Field of Classification Search
CPC ............................ H04L 67/60; H04L 12/4633
See application file for complete search history.

(56) References Cited

U.S. PATENT DOCUMENTS

| | | | |
|---|---|---|---|
| 8,769,102 B1* | 7/2014 | Zhou | G06F 11/3696 709/225 |
| 9,928,151 B1* | 3/2018 | Rodriguez Valadez | G06F 11/26 |
| 10,063,452 B1 | 8/2018 | Dzierwinski et al. | |
| 10,169,206 B2* | 1/2019 | Magre | G06F 11/3692 |
| 2013/0326487 A1* | 12/2013 | Yousouf | G06F 9/455 717/134 |
| 2018/0137035 A1* | 5/2018 | Magre | G06F 11/3692 |
| 2020/0301767 A1* | 9/2020 | Rodecker | G06F 9/546 |
| 2022/0248074 A1* | 8/2022 | Regunathan | H04N 21/2402 |

FOREIGN PATENT DOCUMENTS

| | | |
|---|---|---|
| EP | 2425341 A1 | 3/2012 |
| WO | 2007061241 A1 | 5/2007 |
| WO | 2010127365 A1 | 11/2010 |

OTHER PUBLICATIONS

International Search Report and Written Opinion in PCT International Application No. PCT/EP2023/051936 mailed Apr. 12, 2023.

* cited by examiner

*Primary Examiner* — Mohamed A. Wasel
(74) *Attorney, Agent, or Firm* — Cognition IP, P.C.; Edward Steakley; Saleh Kaihani

(57) ABSTRACT

Disclosed are systems and methods for a software development architecture enabling users to locally test and develop software, using a multitude of remote devices of their choice. The user can choose the remote devices, including the hardware and software on the remote device. The operator of the architecture can provide error analysis, without substantively inspecting the user's software calls and sensitive data. In some embodiments, traffic routing data is used to detect the source and type of a test session error, without inspecting the payload in the traffic.

18 Claims, 13 Drawing Sheets

Quick Launch

| | Real Devices (33) | | | | |
|---|---|---|---|---|---|
| Android | iPhone | | | | |
| iOS | iPad | | | | |
| Windows | | | | | |
| 10 | ☐ iPhone 12 Mini | 14 | ☐ iPhone 8 | 12 | ☐ iPhone 6 Plus 8 |
| 8.1 | ☐ iPhone 12 Pro Max | 14 | ☐ iPhone 7 | 12 | ☐ iPhone 6 8 |
| 8 | ☐ iPhone 12 Pro | 14 | ☐ iPhone 6S | 12 | ☐ iPhone 5S 7 |
| 7 | ☐ iPhone 12 | | ☐ iPhone X | 11 | Show 6 Simulators |
| XP | ☐ iPhone 11 Pro [Safari browser logo] ne 8 Plus 12 | | | | |
| Mac | ☐ iPhone 11 | | ☐ iPhone 8 Plus | 11 | |
| + | ☐ iPhone 11 | | ☐ iPhone 8 | 11 | |
| | ☐ iPhone 11 Pro Max | 14 | ☐ iPhone SE 2020 | 13 | |
| | ☐ iPhone 11 Pro Max | 13 | ☐ iPhone SE | 11 | |
| | ☐ iPhone 8 | | ☐ iPhone 6S Plus | 11 | |
| | ☐ iPhone XS | | ☐ iPhone 6S | 11 | |
| | ☐ iPhone XS | | ☐ iPhone 6 | 11 | |
| | ☐ iPhone XS | | ☐ iPhone 7 | 10 | |
| | ☐ iPhone XS Max | | ☐ iPhone 6S Plus | 9 | |
| | ☐ iPhone XR | | ☐ iPhone 6S | 9 | |

Drag a browser here to add Quick Launch

FIG. 2A

| HYPERDRIVE | FALCON | | | | CHECK THE AWESOME LOCAL DOCUMENTATION TO DEBUG ISSUES. |
|---|---|---|---|---|---|
| SESSION ID | | | | | |
| SESSION TYPE | AUTOMATE_LOGS | | | | AUTH TOKEN | |
| TERMINAL IP | | | | | FORCE LOCAL | FALSE |
| TERMINAL OS | IOS | | | | UPLOAD BANDWIDTH | 17.7 KB |
| SESSION STATUS | TRUE | | | | DOWNLOAD BANDWIDTH | 7.9 MB |
| ERROR TYPE | NONE READ MORE_ | | | | # TERMINAL SOCKETS | 11 |
| REPEATER | | | | | # REPEATER SOCKETS | 7 |
| CREATED AT | 25/08/2021 12:50:27 | | | | # BINARY SOCKETS | 4 |
| TUNNEL TYPE | NODE | | | | SESSION DURATION | 17058 |
| TUNNEL ID | 361453517.0 | | | | TUNNEL VERSION | 8.3 |
| MEAN PING TIME | 22.25 | | | | BINARY CLIENT IP | |
| TOTAL TIME INSIDE | 248647225.375 | | | | DEDICATED IP USED | |
| EXCLUDE HOSTS | [] | | | | THROUGHPUT | 2.0624773514 |
| FORCE REPEATER | FALSE | | | | INCLUDE HOSTS | [] |

TUNNEL CONNECTION TIMELINE

TERMINAL SOCKETS (11.0)

| REF | HOST | PORT | ISPUBLIC | ALIVE TIME(MS) | DNS RESOLUTION(MS) | UPSTREAM | DOWNSTREAM | STATUS | ERROR | Created At |
|---|---|---|---|---|---|---|---|---|---|---|
| 15348014 | | 443 | TRUE | 13824 | 5 | 1.0 KB | 42.5 KB | SUCCESS | | 25/08/2021 12:50:30 |
| 15348183 | | 80 | TRUE | 297 | 0 | 329 BYTES | 811 BYTES | SUCCESS | {JCODE: USOCKET_CLOSE} | 25/08/2021 12:50:36 |
| 15348177 | | 8001 | FALSE | 7398 | 0 | 438 BYTES | 5.9 KB | SUCCESS | {JCODE: USOCKET_END} | 25/08/2021 12:50:36 |
| 15348176 | | 8001 | FALSE | 7399 | 0 | 1.0 KB | 17.4 KB | SUCCESS | {JCODE: USOCKET_CLOSE} | 25/08/2021 12:50:36 |
| 15348175 | | 443 | TRUE | 7399 | 0 | 1.2 KB | 70.8 KB | SUCCESS | {JCODE: USOCKET_CLOSE} | 25/08/2021 12:50:36 |
| 15348255 | | 443 | TRUE | 2572 | 0 | 1.1 KB | 24.2 KB | SUCCESS | {JCODE: USOCKET_CLOSE} | 25/08/2021 12:50:41 |
| 15348252 | | 443 | TRUE | 2698 | 0 | 2.8 KB | 4.0 KB | SUCCESS | {JCODE: USOCKET_CLOSE} | 25/08/2021 12:50:41 |
| 15348253 | | 443 | TRUE | 2684 | 0 | 2.2 KB | 3.9 KB | SUCCESS | {JCODE: USOCKET_CLOSE} | 25/08/2021 12:50:41 |

FIG. 4A

TERMINAL SOCKETS (11.0)

| REF | HOST | PORT | ISPUBLIC | ALIVE TIME(MS) | DNS RESOLUTION(MS) | UPSTREAM | DOWNSTREAM | STATUS | ERROR | CREATED AT |
|---|---|---|---|---|---|---|---|---|---|---|
| 15348014 | | 443 | TRUE | 13824 | 5 | 1.0 KB | 40.5 KB | SUCCESS | {UCODE:"USOCKET_CLOSE"} | 25/08/2021 12:50:30 |
| 15348183 | | 80 | TRUE | 297 | 0 | 329 BYTES | 811 BYTES | SUCCESS | {UCODE:"USOCKET_END"} | 25/08/2021 12:50:36 |
| 15348177 | | 8001 | FALSE | 7398 | 0 | 438 BYTES | 5.9 KB | SUCCESS | {UCODE:"USOCKET_CLOSE"} | 25/08/2021 12:50:36 |
| 15348176 | | 8001 | FALSE | 7399 | 0 | 1.0 KB | 17.4 KB | SUCCESS | {UCODE:"USOCKET_CLOSE"} | 25/08/2021 12:50:36 |
| 15348175 | | 443 | TRUE | 7399 | 0 | 1.2 KB | 70.8 KB | SUCCESS | {UCODE:"USOCKET_CLOSE"} | 25/08/2021 12:50:36 |
| 15348255 | | 443 | TRUE | 2672 | 0 | 1.1 KB | 24.2 KB | SUCCESS | {UCODE:"USOCKET_CLOSE"} | 25/08/2021 12:50:41 |
| 15348252 | | 443 | TRUE | 2698 | 0 | 2.8 KB | 4.0 KB | SUCCESS | {UCODE:"USOCKET_CLOSE"} | 25/08/2021 12:50:41 |
| 15348253 | | 443 | TRUE | 2684 | 0 | 2.2 KB | 3.9 KB | SUCCESS | {UCODE:"USOCKET_CLOSE"} | 25/08/2021 12:50:41 |
| 15348254 | | 443 | TRUE | 2383 | 0 | 5.3 KB | 4.6 KB | SUCCESS | {UCODE:"USOCKET_CLOSE"} | 25/08/2021 12:50:41 |
| 15348169 | | 8001 | FALSE | 7345 | 0 | 1.9 KB | 2.4 MB | SUCCESS | {UCODE:"USOCKET_CLOSE"} | 25/08/2021 12:50:36 |
| 15348178 | | 8001 | FALSE | 7398 | 0 | 438 BYTES | 5.3 MB | SUCCESS | {UCODE:"USOCKET_CLOSE"} | 25/08/2021 12:50:36 |

REPEATER SOCKETS (7.0)

| REF | REMOTE IP | PORT | CONNECT TIME | ALIVE TIME(MS) | UPSTREAM | DOWNSTREAM | STATUS | ERROR | CREATED AT |
|---|---|---|---|---|---|---|---|---|---|
| 15348183 | | 80.0 | 9.0 | 211.0 | 302 BYTES | 799 BYTES | SUCCESS | {UCODE:"USOCKET_CLOSE"} | 25/08/2021 12:50:37 |
| 15348014 | | 443.0 | 1.0 | 13814.0 | 1.0 KB | 42.5 KB | SUCCESS | {UCODE:"USOCKET_CLOSE"} | 25/08/2021 12:50:30 |
| 15348175 | | 443.0 | 1.0 | 7317.0 | 1.2 KB | 70.8 KB | SUCCESS | {UCODE:"USOCKET_CLOSE"} | 25/08/2021 12:50:36 |
| 15348255 | | 443.0 | 1.0 | 2555.0 | 1.0 KB | 24.2 KB | SUCCESS | {UCODE:"USOCKET_CLOSE"} | 25/08/2021 12:50:41 |
| 15348252 | | 443.0 | 22.0 | 2694.0 | 2.8 KB | 4.0 KB | SUCCESS | {UCODE:"USOCKET_CLOSE"} | 25/08/2021 12:50:41 |
| 15348253 | | 443.0 | 22.0 | 2677.0 | 2.1 KB | 3.9 KB | SUCCESS | {UCODE:"USOCKET_CLOSE"} | 25/08/2021 12:50:41 |
| 15348254 | | 443.0 | 27.0 | 2374.0 | 5.3 KB | 4.6 KB | SUCCESS | {UCODE:"USOCKET_CLOSE"} | 25/08/2021 12:50:41 |

BINARY SOCKETS (4.0)

| REF | HOST | PORT | REMOTE IP | CONNECT TIME | ALIVE TIME(MS) | UPSTREAM | DOWNSTREAM | STATUS | ERROR | CREATED AT | PROXY |
|---|---|---|---|---|---|---|---|---|---|---|---|
| 15348177 | | 8001 | | 1 | 5095 | 417 BYTES | 5.9 KB | SUCCESS | {UCODE:"USOCKET_END"} | 25/08/2021 12:50:37 | {"HOST":"U","UPORT":"U"} |
| 15348176 | | 8001 | | 0 | 7315 | 1022 BYTES | 17.4 KB | SUCCESS | {UCODE:"USOCKET_CLOSE"} | 25/08/2021 12:50:36 | {"HOST":"U","UPORT":"U"} |
| 15348169 | | 8001 | | 1 | 7752 | 1.9 KB | 2.4 MB | SUCCESS | | 25/08/2021 12:50:36 | {"HOST":"U","UPORT":"U"} |
| 15348178 | | 8001 | | 1 | 5111 | 417 BYTES | 5.3 MB | SUCCESS | {UCODE:"USOCKET_END"} | 25/08/2021 12:50:41 | {"HOST":"U","UPORT":"U"} |

FIG. 4B

| TERMINAL SOCKETS (50.0) | | | | | | | | | | |
|---|---|---|---|---|---|---|---|---|---|---|
| REF | HOST | PORT | ISPUBLIC | ALIVE TIME(MS) | DNS RESOLUTION(MS) | UPSTREAM | DOWN-STREAM | STATUS | ERROR | CREATED AT |
| 54614844 | | 443 | FALSE | 65651 | 77 | 1.4 KB | 12.0 KB | SUCCESS | {"CODE":"UIDLE_TIMEOUT"} | 25/08/2021 10:23:14 |
| 54614733 | | 443 | FALSE | 69385 | 86 | 4.9 KB | 276.7 KB | SUCCESS | {"CODE":"UIDLE_TIMEOUT"} | 25/08/2021 10:23:11 |
| 54625164 | | 443 | TRUE | 206695 | 2 | 488.8 KB | 8.5KB | SUCCESS | | 25/08/2021 10:27:40 |
| 54616135 | | 443 | TRUE | 442407 | 0 | 1019.8 KB | 8.5KB | SUCCESS | | 25/08/2021 10:23:44 |
| 54631162 | | 443 | FALSE | 38535 | 0 | 32 BYTES | 2 BYTES | SUCCESS | | 25/08/2021 10:30:28 |
| 54631008 | | 443 | TRUE | 42961 | 0 | 2.1 KB | 2.0KB | SUCCESS | | 25/08/2021 10:30:24 |
| 54631418 | | 443 | FALSE | 32522 | 0 | 32 BYTES | 2 BYTES | SUCCESS | | 25/08/2021 10:30:34 |
| 54630931 | | 443 | FALSE | 44543 | 0 | 32 BYTES | 2 BYTES | SUCCESS | | 25/08/2021 10:30:22 |
| 54614635 | | 443 | TRUE | 50252 | 1 | 1.1 KB | 6.2 KB | SUCCESS | {"CODE":"USOCKET_END"} | 25/08/2021 10:23:07 |
| 54614759 | | 443 | FALSE | 68598 | 0 | 1.8 KB | 25.1KB | SUCCESS | {"CODE":"UIDLE_TIMEOUT"} | 25/08/2021 10:23:12 |
| 54622357 | | 443 | FALSE | 163 | 0 | 37 BYTES | 12BYTES | SUCCESS | {"CODE":"USOCKET_END"} | 25/08/2021 10:26:22 |
| 54624952 | | 80 | TRUE | 5257 | 0 | 665 BYTES | 800.2KB | SUCCESS | {"CODE":"USOCKET_END"} | 25/08/2021 10:27:35 |
| 54620460 | | 80 | TRUE | 5258 | 0 | 703 BYTES | 973.8KB | SUCCESS | {"CODE":"USOCKET_END"} | 25/08/2021 10:25:31 |
| 54619163 | | 80 | TRUE | 5161 | 0 | 531 BYTES | 10.3KB | SUCCESS | {"CODE":"USOCKET_END"} | 25/08/2021 10:24:57 |
| 54622213 | | 443 | FALSE | 63116 | 0 | 1.9 KB | 17.6 KB | SUCCESS | {"CODE":"UIDLE_TIMEOUT"} | 25/08/2021 10:26:19 |
| 54632347 | | 443 | FALSE | 17 | 0 | 32 BYTES | 2 BYTES | ERROR | {"CODE":"UNO_WS_CONNECTION"} | 25/08/2021 10:30:58 |
| 54622274 | | 443 | TRUE | 70135 | 4 | 141.5KB | 5.8 KB | SUCCESS | {"CODE":"USOCKET_END"} | 25/08/2021 10:26:20 |
| 54622218 | | 443 | FALSE | 60279 | 0 | 1.5KB | 5.6 KB | SUCCESS | {"CODE":"USOCKET_END"} | 25/08/2021 10:26:19 |
| 54617042 | | 80 | TRUE | 5114 | 0 | 658 BYTES | 2.1 KB | SUCCESS | {"CODE":"USOCKET_END"} | 25/08/2021 10:24:07 |
| 54625092 | | 443 | FALSE | 199918 | 0 | 10.6 KB | 16.5 KB | SUCCESS | {"CODE":"USOCKET_END"} | 25/08/2021 10:27:38 |
| 54623377 | | 80 | TRUE | 5195 | 0 | 653 BYTES | 45.4 KB | SUCCESS | {"CODE":"USOCKET_END"} | 25/08/2021 10:26:49 |
| 54632589 | | 443 | FALSE | 17 | 0 | 32 BYTES | 2 BYTES | ERROR | {"CODE":"UNO_WS_CONNECTION"} | 25/08/2021 10:31:04 |
| 54614760 | | 443 | FALSE | 60514 | 0 | 1.2 KB | 4.3 KB | SUCCESS | {"CODE":"UIDLE_TIMEOUT"} | 25/08/2021 10:23:12 |
| 54631892 | | 443 | FALSE | 17 | 0 | 32 BYTES | 2 BYTES | ERROR | {"CODE":"UNO_WS_CONNECTION"} | 25/08/2021 10:30:46 |
| 54629902 | | 443 | FALSE | 60031 | 0 | 32 BYTES | 4.4 KB | SUCCESS | {"CODE":"UIDLE_TIMEOUT"} | 25/08/2021 10:29:58 |
| 54614857 | | 443 | TRUE | 50390 | 0 | 111.8 KB | 17.8 KB | SUCCESS | {"CODE":"UIDLE_TIMEOUT"} | 25/08/2021 10:23:14 |
| 54624786 | | 443 | FALSE | 66760 | 0 | 8.6 KB | 213.2 KB | SUCCESS | {"CODE":"UIDLE_TIMEOUT"} | 25/08/2021 10:27:31 |
| 54614762 | | 443 | FALSE | 68600 | 0 | 3.0 KB | 19.3 KB | SUCCESS | {"CODE":"UIDLE_TIMEOUT"} | 25/08/2021 10:23:12 |
| 54614852 | | 443 | TRUE | 50152 | 2 | 1.1 KB | 292.6 KB | SUCCESS | {"CODE":"UIDLE_TIMEOUT"} | 25/08/2021 10:23:14 |
| 54614732 | | 443 | FALSE | 69416 | 89 | 3.2 KB | 19.3 KB | SUCCESS | {"CODE":"USOCKET_END"} | 25/08/2021 10:23:11 |
| 54614761 | | 443 | FALSE | 68531 | 0 | 1.8 KB | 118.1 KB | SUCCESS | {"CODE":"USOCKET_END"} | 25/08/2021 10:23:12 |

FIG. 6

| BINARY SOCKETS (16.0) | | | | | | | | | | |
|---|---|---|---|---|---|---|---|---|---|---|
| REF | HOST | PORT | REMOTE IP | CONNECT TIME | ALIVE TIME (MS) | UP STREAM | DOWN STREAM | STATUS | ERROR | CREATED AT | PROXY |
| 54614857 | | 443 | | 27 | 76 | 0 BYTES | 0 BYTES | SUCCESS | {UCODE: UCODE_CLOSE} | 25/08/2021 10:24:04 | {HOST:"U", PORT:"U"} |
| 54614733 | | 443 | | 88 | 69258 | 4.8 KB | 276.7 KB | SUCCESS | {UCODE: UCODE_CLOSE} | 25/08/2021 10:23:11 | {HOST:"U", PORT:"U"} |
| 54624786 | | 443 | | 12 | 66738 | 8.6 KB | 17.8 KB | SUCCESS | {UCODE: UCODE_CLOSE} | 25/08/2021 10:27:31 | {HOST:"U", PORT:"U"} |
| 54614732 | | 443 | | 87 | 69291 | 3.1 KB | 292.6 KB | SUCCESS | {UCODE: UCODE_CLOSE} | 25/08/2021 10:23:11 | {HOST:"U", PORT:"U"} |
| 54622213 | | 443 | | 85 | 63083 | 1.8 KB | 17.6 KB | SUCCESS | {UCODE: UCODE_CLOSE} | 25/08/2021 10:26:19 | {HOST:"U", PORT:"U"} |
| 54614761 | | 443 | | 84 | 60496 | 1.8 KB | 118.1 KB | SUCCESS | {UCODE: UCODE_CLOSE} | 25/08/2021 10:22:12 | {HOST:"U", PORT:"U"} |
| 54614760 | | 443 | | 84 | 60480 | 1.1 KB | 4.3 KB | SUCCESS | {UCODE: UCODE_CLOSE} | 25/08/2021 10:23:12 | {HOST:"U", PORT:"U"} |
| 54614762 | | 443 | | 84 | 60466 | 3.0 KB | 213.2 KB | SUCCESS | {UCODE: UCODE_CLOSE} | 25/08/2021 10:23:12 | {HOST:"U", PORT:"U"} |
| 54622218 | | 443 | | 13 | 60248 | 1.5 KB | 5.6 KB | SUCCESS | {UCODE: UCODE_CLOSE} | 25/08/2021 10:26:19 | {HOST:"U", PORT:"U"} |
| 54624836 | | 443 | | 2 | 2407 | 2.0 KB | 7.2 MB | SUCCESS | {UCODE: UCODE_CLOSE} | 25/08/2021 10:27:33 | {HOST:"U", PORT:"U"} |

FIG. 7

| | | | | | | | |
|---|---|---|---|---|---|---|---|
| 54623012 | 443 | -1 | 10169 | 0 BYTES | 0 BYTES | ERROR | {U'CODE': U'ENOTFOUND', U'SYSCALL': U'GETADDRINFO', U'ERRNO': U'ENOTFOUND', U'HOSTNAME': U' U'HOST': U' U'PART': 443.0} | 25/08/2021 10:27:37 | {U'HOST': U'', U'PORT': U''} |
| 54614758 | 443 | 84 | 68564 | 1.8 KB | 25.1 KB | SUCCESS | {U'CODE': U'CODE_CLOSE'} | 25/08/2021 10:23:12 | {U'HOST': U'', U'PORT': U''} |
| 54622357 | 443 | -1 | 93 | 0 BYTES | 0 BYTES | ERROR | {U'CODE': U'ENOTFOUND', U'SYSCALL': U'GETADDRINFO', U'ERRNO': U'ENOTFOUND', U'HOSTNAME': U' U'HOST': U' U'PART': 443.0} | 25/08/2021 10:26:22 | {U'HOST': U'', U'PORT': U''} |
| 54615109 | 443 | 22 | 638 | 1.2 KB | 39.9 MB | SUCCESS | {U'CODE': U'SOCKET_END'} | 25/08/2021 10:23:20 | {U'HOST': U'', U'PORT': U''} |
| 54614780 | 443 | 86 | 662 | 599 BYTES | 6.0 KB | SUCCESS | {U'CODE': U'CODE_CLOSE'} | 25/08/2021 10:23:12 | {U'HOST': U'', U'PORT': U''} |
| 54614844 | 443 | 107 | 63542 | 1.3 KB | 12.0 KB | SUCCESS | {U'CODE': U'CODE_CLOSE'} | 25/08/2021 10:23:14 | {U'HOST': U'', U'PORT': U''} |

DERIVING PROXY STABILITY WITHOUT NETWORK INSPECTION

CROSS-REFERENCE TO RELATED APPLICATIONS

This application is a continuation of U.S. application Ser. No. 17/586,766, filed on Jan. 27, 2022, which is hereby incorporated by reference in its entirety.

BACKGROUND

Field

This invention relates generally to the field of enabling a remote infrastructure for application and website development on multiple platforms, and more particularly to troubleshooting and error detection in such infrastructure, using routing and traffic information without inspecting traffic content.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The multitude of computers, mobile devices and platforms have given consumers a vast universe of choices. Naturally, software, application and website developers have a keen interest in ensuring their products work seamlessly across the existing platforms, including older devices on the market. This creates a challenge for the developers to properly test their products on the potential devices and platforms that their target consumer might use. On the one hand, acquiring and configuring multiple potential target devices can strain the resources of a developer. On the other hand, the developer cannot risk disregarding a potential target device in his typical development cycle. Even for prominent platforms, such as IOS® and Android®, at any given time, there are multiple generations and iterations of these devices on the market, further complicating the development and testing process across multiple platforms. This dynamic illustrates a need for a robust infrastructure that enables developers to test their products across multiple devices and platforms, without having to purchase or configure multiple devices. As part of the development cycle and testing of products, the developers would also desire to receive data on error analysis, without compromising the security and integrity of their sensitive data. For example, many developers, while appreciate or need to receive error analysis information, they are not willing to share the underlying data with third party service providers. Described systems and techniques enable software developers to test their devices across multiple platforms, without having to invest resources in the hardware, software and configuration needed to perform multi-platform development. The developers can also receive error analysis and data related to their development efforts, without exposing their sensitive traffic/data to a third-party operator.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

FIGS. 2A-2C illustrate displays of an infrastructure application with which a user developer can test a software using the infrastructure.

FIGS. 4A-4B illustrates an example of an excerpt of a user interface, which can include a visualization of a test session, including indications of errors detected in a test session.

FIG. 6 illustrates an example excerpt of a terminal sockets listing.

FIG. 7 illustrates a binary sockets listing.

DETAILED DESCRIPTION

Figure 1:
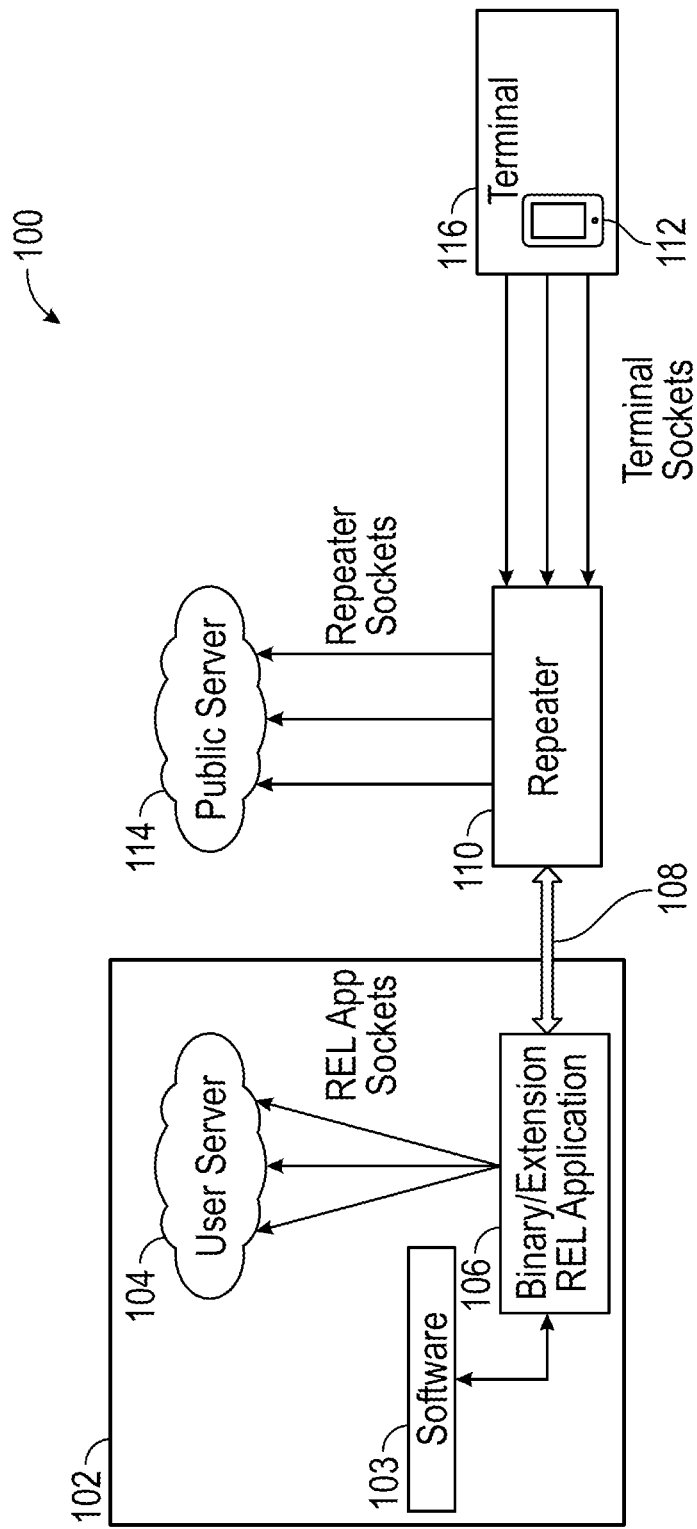
FIG. 1 illustrates a diagram of an infrastructure, enabling a software developer user to perform local software development, using remote devices.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

A critical aspect of developing software is to test the software on a variety of platforms, operating systems, and devices on which the software is going to be running. Another aspect of developing software is to develop the software in a non-public setting before launch to ensure the software meets its production goals. Local development is often used to program and debug software. In a local development environment, the development team may operate from different geographical regions, logging into a private network to code and develop the software. The private network may be closed off from the rest of the internet or may interact with the outside world through controlled mechanisms and protocols to ensure security, privacy and confidentiality of the development environment. Naturally, software development in many cases, require interaction with public servers on the internet, and testing the software on a multitude of platforms and devices making calls and interacting with public sources.

FIG. 1 illustrates a diagram of an infrastructure 100, enabling a software developer user to perform local software development, using remote devices. The user may establish one or more instances of a private or user test network 102, to locally develop software 103 among the user team members. The user test network 102 can include one or more user servers 104 to handle software calls, APIs and other development needs of software 103, locally within the user test network 102. An operator within the infrastructure 100 can provide a remote-enabled local (REL) application 106, which the user can receive and run in the user test network 102. The operator can further provide a repeater 110 and terminal devices 112 to enable the user to locally develop the software 103, using terminal devices 112. Throughout this disclosure, this operator may be referred to as the operator of the infrastructure 100 or simply as the operator. The operator in most cases is independent from the user developer team and may have no access to the user test network 102, other than through the REL application 106. The software 103 may be a website and/or a web application, running on a browser powered by the test network 102. The REL application 106 connects with the browser running the software 103 and issues the software 103 traffic requests on a remote device at the terminal 112. The display output of the remote device is also generated on the browser at the test network 102, for the user to see and inspect.

The infrastructure 100 enables mirroring of the user developer interactions on the terminal device 112 and mirroring of the display and output of the terminal device 112 on the user developer's local machine. The term mirroring does not imply that the infrastructure 100 runs parallel processes at the terminal device 112 and the user test network 102, or that the infrastructure 100 generates mirrored copies of data or processes between the two locations. Instead, the traffic requests of the software 103 are issued from the terminal device 112 and responses from a public server 114 and/or the user test network 102 are tunneled through the infrastructure 100 and relayed to the terminal device 112. In other words, the same data packets in a request and/or response is routed, without generating copies of the packets at the two locations. In a typical case, the user/developer may use a desktop, having a keyboard, monitor and mouse to develop and test software on a remote terminal device 112. The remote terminal device 112 in a typical case may be a smartphone or tablet device, running a mobile operating system. The infrastructure 100 mirrors the interactions of the user developer, received on the user developer's local machine, on the terminal device 112. The infrastructure 100 also mirrors the screen and the output of the terminal device 112 on the user developer machine in the user test network 102. The mirroring operations of the infrastructure 100 can be considered near real time, save for typical network delays that may be present. Still, the interactions between the user developer and mirrored display of the terminal device 112 in the user developer's local machine is seamless and appears, without perceptible delay. The user developer receives a display of his chosen terminal device 112 on his local monitor and uses his keyboard, mouse, or other input devices to interact with the terminal device 112, as if the terminal device 112 was locally present. The user developer uses his local input devices (e.g., keyboard, mouse, etc.) to input gestures typical to the terminal device 112. The infrastructure 100 can translate user developer local commands to inputs and input formats for the terminal device 112. For example, when the terminal device 112 is a smartphone, the user developer's inputs are translated to inputs such as swipes, slides, taps, pinches, or other smartphone gesture inputs. The output of the terminal device 112 is generated on the local monitor of the user developer in near real time, such that the user developer interactions with the terminal device 112 is seamless.

A tunneling agent can establish a tunneling connection 108 between the REL application 106 and a repeater 110. The repeater 110 acts as a proxy, receiving and routing traffic to and from the REL application 106 through the tunneling connection 108. Under normal operating conditions, the tunneling connection 108 is ON during a test session. Furthermore, the infrastructure 100 allows the developer to test software calls to public servers 114 on the internet or other non-user-defined networks. The REL application 106 can alternatively be termed a binary/extension application.

The terminal devices 112 can be in a terminal 116. Multiple terminals 116 in the form of datacenters or cloud infrastructure backbone can be deployed around the world. Each terminal 116 can include a substantial number of products, devices, and platforms to enable thousands of users in various geographical locations to test their software on the terminal devices 112. For example, the terminal 116 can include a variety of cellphone brands, cellphone operating systems, different models (new, midmarket, and old versions) of the cellphones, various browsers, and various operating systems, and a combination of devices hardware and software-wise. The terminal 116 can include multiple copies of the same device and software combination to enable multiple users to use them simultaneously for development. In some embodiments, thousands of devices and platforms are housed in multiple datacenters across different geographical regions to provide the functionality described herein to thousands of software developers. Nearly a million daily test sessions across the infrastructure 100 are typical. In some embodiments, the terminal 116 can be implemented and deployed in and as a cloud architecture.

FIG. 2A illustrates an option menu, via which a user developer can choose a cell phone and a corresponding mobile browser to test the software 103. The software 103 can include any software application or program, including a web application, a website, or other software that a developer may wish to develop and test locally across multiple platforms. As an example, the software 103 can be a web application or a website, accessible in the user test network 102 via accessing a URL in a local browser of the user developer. In this example, the user developer runs the REL application 106 locally on his machine. Subsequently, a terminal device 112 and a browser is selected. In FIG. 2A, the user developer is selecting Safari® on iPhone® 12. Once the user developer selects a type of terminal device 112 and a browser, a physical terminal device 112 in a suitable terminal 116 is configured with the user selection and connected to the REL application 106 through the Repeater and the tunneling connection 108.

Figure 2B:
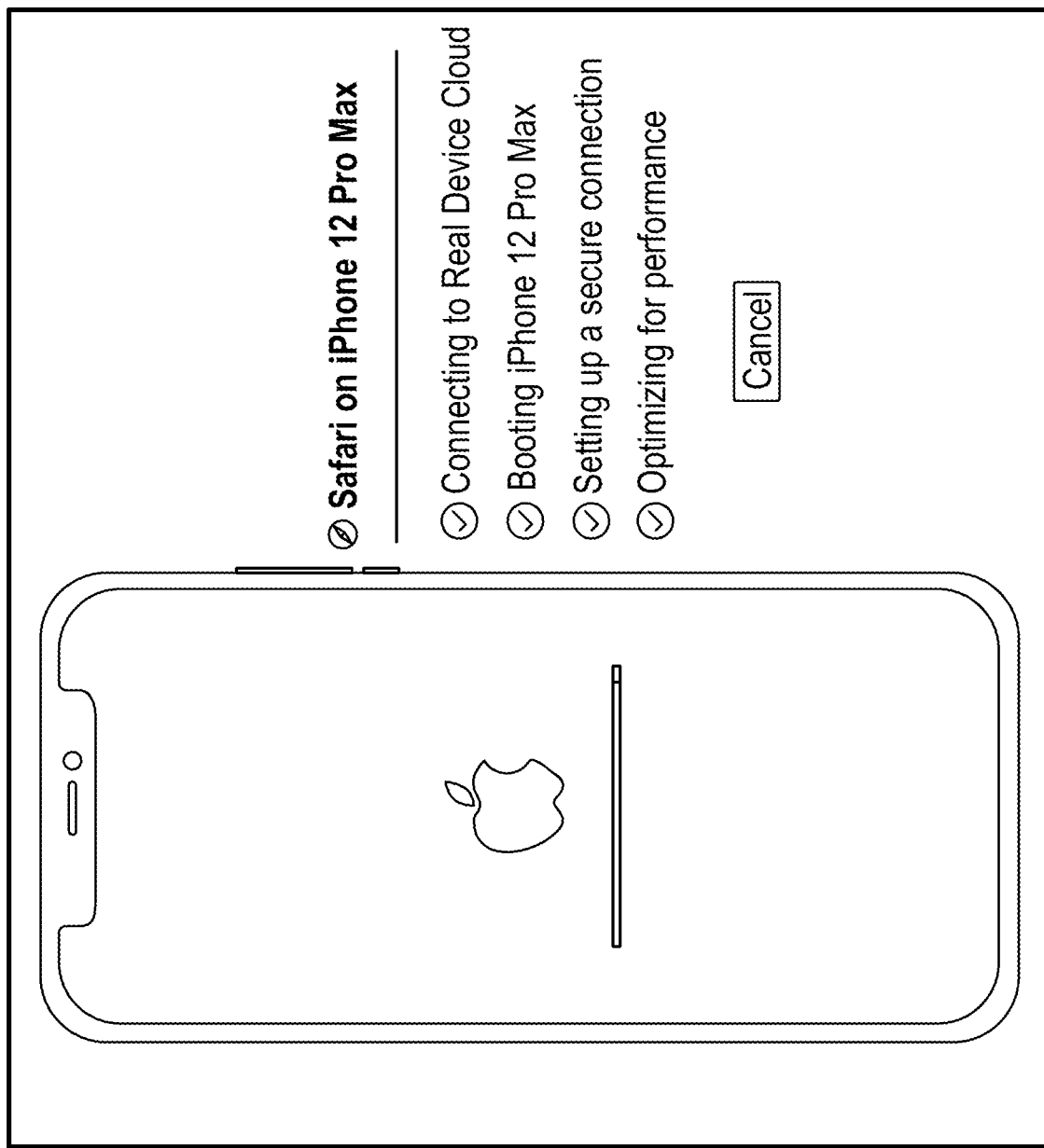

FIG. 2B illustrates that an example platform selected by the software developer can generate a display of the selected platform, within the REL application 106 for the user to monitor the output and processes of the software 103, as it appears on the selected terminal device 112.

Figure 2C:
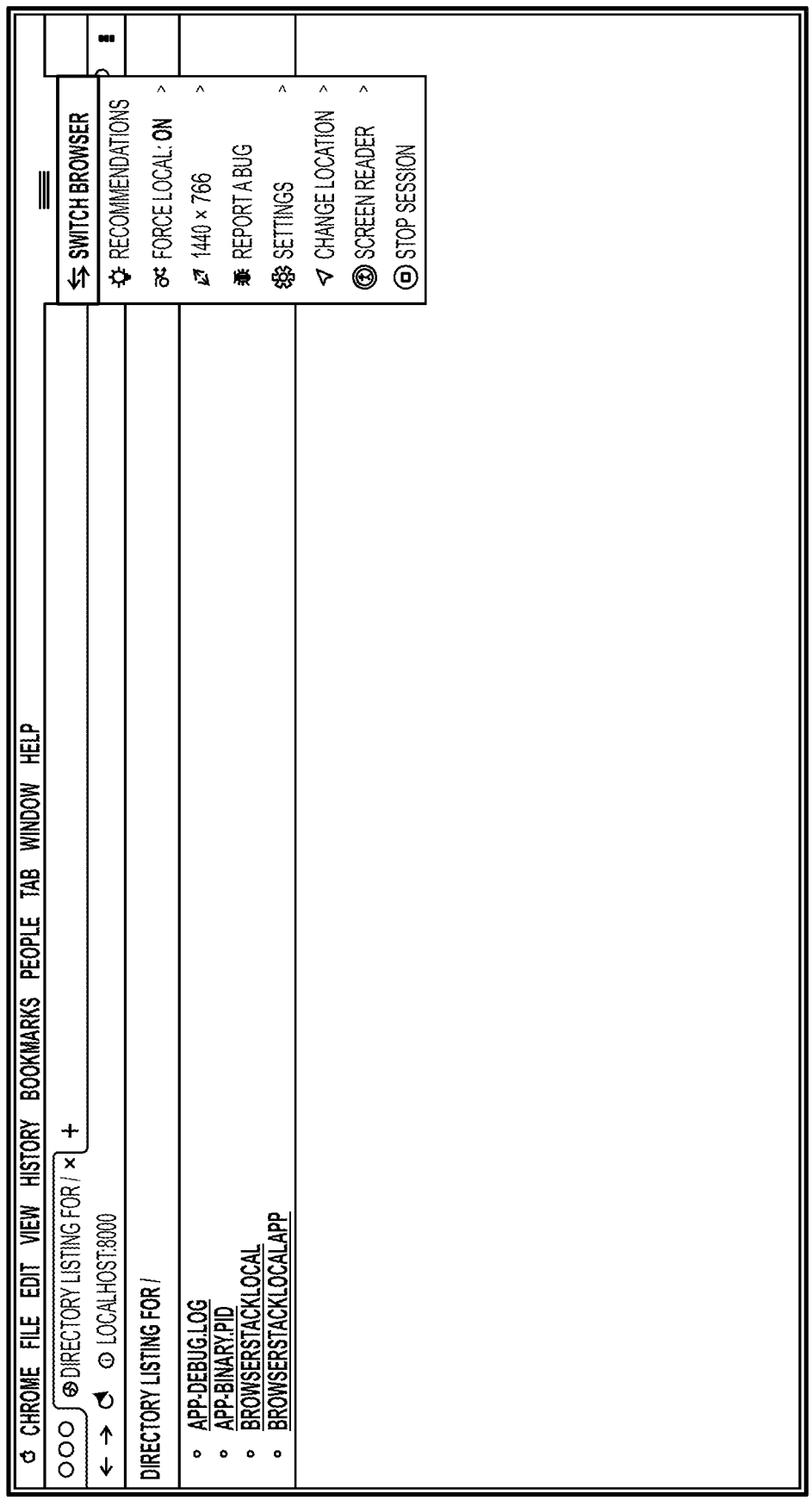

FIG. 2C illustrates a display of a user developer machine accessing the software 103 (e.g., web application or a website) for the purposes of using the infrastructure 100 for testing. Here, the user developer has chosen a Chrome® browser, running on an iPhone® 12. The REL application 106 launches an instance of the Chrome® browser on the user developer's machine and configures a remote iPhone® 12 to also launch an instance of the Chrome® browser. The user developer enters a URL for accessing the software 103 (in this example a locally hosted web application, named localhost:8000). The URL can be a request to locally access the resources of the user test network 102, which host the software 103. Other requests from the user's browser may be requests to access public servers 114. The software 103 issues requests from the user's browser in the user's local machine, in the course of a test session. The requests are captured by the REL application 106. As will be described, the requests generated from the user's browser are captured by REL application 106 and are issued from an instance of the user's selected browser and platform, for example, a Chrome® browser running on a remote iPhone.

Referring back to FIG. 1, when a terminal device 112 is selected and a test session is instantiated, the selected terminal device 112 is configured, such that software 103 requests or traffic is issued from the selected terminal device 112 through the tunneling connection 108 and the repeater 110. The repeater 110 acts as a proxy receiving and routing the requests in a manner that allows the terminal device 112 to issue the same traffic as the software 103 does in the user developer local machine, had the software 103 was not being tested in the infrastructure 100. Proxy servers act as intermediaries between request and response, and can provide a variety of functionality, including providing privacy, security, filtering, firewall, speed efficiency, caching, and other functionality. Proxy servers differ in how much exposure they have into the substance of the data they are routing. For example, some proxies implementing SSL inspection have a complete view into the content of the traffic they route, including passwords, and other sensitive data. Other proxy servers, for example, some using the TCP/IP model, may have no access to the payload in the data packets being transmitted, other than some routing information. Similarly, in some embodiments, the repeater 110 does not have access to payload or substantive data being transmitted.

In the context of software development using the infrastructure 100, when thousands or millions of test sessions are performed daily, millions of error messages can be generated on a rolling basis across multiple test sessions of millions of users. These error messages can be part of the underlying tests and their inspection and resolution can be a part of debugging and/or developing the software 103. On the other hand, some error messages can indicate issues in the infrastructure 100, whose investigation and resolution can improve the functionality of the infrastructure 100. A traditional approach to investigating error messages in computer systems and development environments is for engineers from the developer side conference call with engineers of the infrastructure 100 to track and investigate the errors. For example, if the developer is not able to access a test uniform resource locator (URL), the engineers from both sides can reproduce the URL requests and track the traffic and the generated responses to determine where and why the error might have occurred. This traditional approach can be impractical in the context of software development and testing using the remote-enabled local testing of the infrastructure 100. Therefore, it is desirable to have an efficient visualization and processing of the error messages, encountered in the infrastructure 100.

One challenge with troubleshooting and error processing in the infrastructure 100 is that some user developers may not wish the provider of the remote-enabled local testing to view the payloads and substantive data in their software calls. In these instances, the described embodiments, can provide insight and analysis into an error within the infrastructure 100, without substantively inspecting the traffic. Persons of ordinary skill in the art may sometimes colloquially refer to substantively inspecting an application traffic as "sniffing the traffic". The described embodiments enable error processing and analysis within the infrastructure 100, without the privacy and confidentiality issues associated with substantively inspecting traffic. Furthermore, the described techniques for error analysis are provided as scalable solutions that can be efficiently deployed across thousands of users and millions of error messages.

Figure 3:
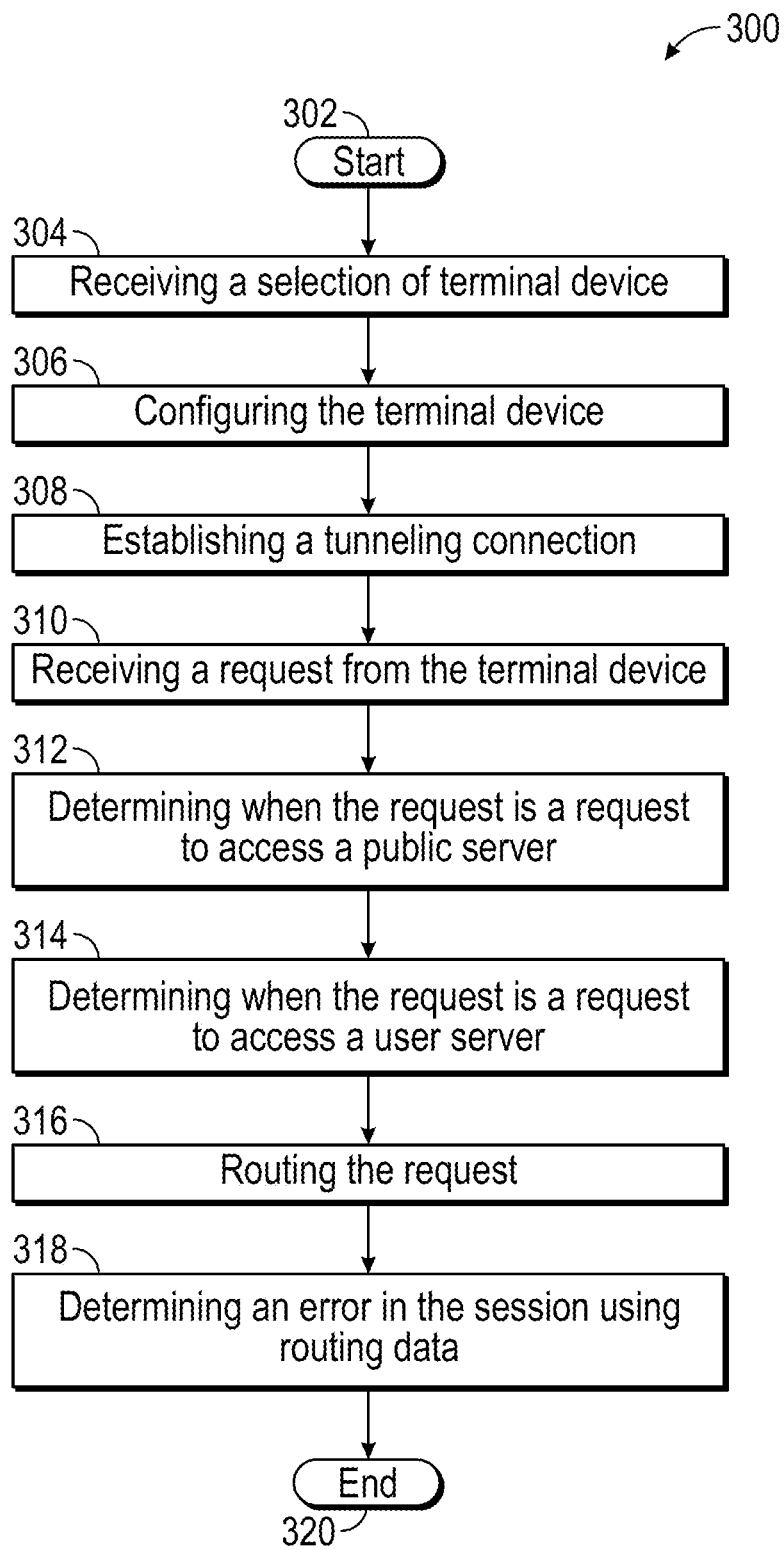
FIG. 3 illustrates a flowchart of a method of the operations within the infrastructure of FIG. 1.

FIG. 3 illustrates a flowchart of a method 300 of the operations within the infrastructure 100. The method 300 starts at step 302. At step 304, the REL application 106 receives a user selection of a terminal device 112 upon which the user wishes to test the software 103. At step 306, the terminal device 112 is configured to issue the traffic requests of the software 103. In some cases, the software 103 can be a web application or a website code intended to run on a particular browser. In these scenarios, the user can indicate the selected browser. Part of the configuration of the terminal device 112 then can include launching and configuring the selected browser on the selected terminal device 112 to issue the requests as the software 103 might issue locally. The calls and processes of the software 103 can include URL requests and TCP/IP traffic. At step 308, a tunneling agent establishes a tunneling connection 108 from the REL application 106 to the repeater 110. The repeater 110 acts as a proxy forwarding the requests and responses to and from the terminal device 112, public servers 114 and REL application 106.

The terminal device 112 through the tunneling connection 108 and the REL application 106 issues the traffic requests of the software 103. Consequently, a request typed in the browser in the user test network 102 is issued from the terminal device 112 to the repeater 110. At step 310, the repeater receives the request from the terminal device 112 and analyzes it for routing. At step 312, if the repeater determines that the request is a request for accessing the public server 114, the repeater 110 routes the request to the public server 114.

At step 314, if the repeater 110 cannot resolve the request to a public server 114, the repeater 110 forwards the request to the REL application 106 to resolve the request locally within the user test network 102. The repeater 110 and the REL application 106 can have access to domain name servers (DNSs) and the mapping of public or private IP addresses to route the requests. In some embodiments, the repeater 110 has access to a first stage DNS routing table, which can include mappings of URLs and/or IP addresses to one or more public servers 114 and the REL application 106 can has access to a second stage DNS routing table, which can include mappings of URLs and/or IP addresses to internal resources of the user test network 102, including for example, local user server 104. The repeater 110 can has access to a first stage DNS to resolve requests to one or more public servers 114. The REL application 106 can have access to a second stage DNS to resolve non-public server requests within the user test network 102, for example, by routing traffic to one or more user servers 104. Indeed, the user developer may utilize both internal user servers 104 and public servers 114 to carry out tests. For example, some tests include requests, where the requests include a URL access request to an IP address corresponding to a user server 104, or to a public server 114. For testing, the user developer can also overwrite a URL or IP address corresponding to a public server 114 to be routed to an internal resource instead of the public server 114.

The test requests of the software 103 can be issued from the terminal device 112 to the repeater 110. The requests from the terminal device 112 to the repeater 110 can be termed terminal sockets. The requests that are forwarded from the repeater 110 to the public server 114 can be termed repeater sockets, and the requests that are forwarded from the REL application 106 to the user servers 104 can be termed REL application sockets or binary sockets. In some embodiments, the terminal sockets, the repeater sockets and the REL application sockets are TCP/IP packets.

At step 316, the method 300 routes a request either at the repeater layer or at the REL application layer. At step 318, the method 300 includes determining an error in the test session using the routing data generated when routing a request. The method 300 does not examine the traffic substantively to determine and analyze a test session error. Instead, the method 300 utilizes routing and traffic data to identify potential source and type of test session errors. The method ends at step 320.

One method of identifying an error in a test session is to track the number of terminal sockets, the repeater sockets and the REL application sockets. When the test session is error free, the number of terminal sockets equal the sum of the repeater sockets count and the REL application sockets count. In other words, when the test session is error free, the number of requests from the terminal device 112 to the repeater 110 equals the number of requests from the repeater 110 to public server 114 and the number of requests from the REL application 106 to the user test network (e.g., user server 104). This is because any test requests (e.g., URL access requests) are resolved at the repeater layer by being forwarded to a public server 114 or resolved at the REL application layer by being forwarded and resolved by the user test network 102. A request not resolved by either public servers 114 or private user test network 102 indicates an error.

In some embodiments, a visual representation of a test session along with aggregated information regarding the activities of the sockets can assist the user developer or the operator of the infrastructure 100 to analyze test session errors more efficiently. FIG. 4A illustrates an example of a user interface (UI) 400 which can include a visualization of a test session, including indications of errors detected in a test session. The UI 400 can be generated in a browser window or in a dedicated app accessible to the user developer and the operator. In some embodiments, the user developer can access the UI 400 through the REL application 106 on the user's local machine.

The UI 400 can include a summary section 402 outlining a summary of characteristics of a test session. The summary section 402 can include information such as session id, the terminal device 112 IP address, operating system, repeater 110 IP address and/or URL, timing information, including session duration, start and end times, tunneling connection 108 data, authentication data, bandwidth data, and version information. The summary section 402 can also include a count for each of the terminal sockets, repeater sockets and REL application sockets. The count of REL application sockets is shown as #Binary Sockets. In the example shown in FIG. 4A, the number of terminal sockets (11) equals the sum of the repeater sockets (7) and the binary sockets (4). Consequently, the illustrated test session is error free, at least insofar as the particular characteristics of the count of terminal sockets matching the count of repeater and binary sockets. The summary section 402 can include a session status line, indicating "true" if the session has been error free (or the errors have been below a threshold), and indicating "false" if the session errors have been detected (or have been detected to be above a threshold).

Furthermore, during an error free test session, the tunneling connection 108 is an always-ON connection. The UI 400 can include a tunnel connection timeline 404 in the form of a display graphics. In one embodiment, the timeline 404 can be shown as a horizontal bar in a color corresponding to the status of the tunneling connection 108. For example, a section of the bar proportional to the duration of the tunnel connection 108 being ON during the session can be shown in green, while a section of the bar proportional to the duration of the tunnel connection 108 being OFF during the session can be shown in red. The UI 400 can include a terminal sockets listing 406, repeater sockets listing, and REL application (Binary) sockets listing, along with additional information, such as a reference number, the host URL that was the target of the request, port number that the request was trying to access, whether the requested destination was a public destination or private (e.g., whether destination was public server 114 or user server 104), the timing of the DNS resolution, the volume of upstream/downstream traffic due to the connection request, the status of the request, including whether the request was successfully routed, any error message received from the public server 114, the user server 104 or other components of the infrastructure 100, and the timing information for the request. In FIG. 4A, a partial listing of the terminal sockets listing 406 for a test session is visible. The information visualized in the UI 400 and described herein are provided as examples. Other information about the session may be provided in addition to or in lieu of the ones listed here. Alternative graphics or textual representations can be used in addition to or in lieu of the ones described and illustrated herein. FIG. 4B illustrates an alternative view of the UI 400, where additional socket listings are visible. The UI 400 can include the terminal sockets listing 406, as well as repeater sockets listing 408 and binary sockets listing 410. The repeater sockets listing 408 and the binary sockets listing 410 include similar information as described above in relation to the terminal sockets listing 406, but the information and data in the listings 408 and 410 are for requests routed from the repeater 110 and the REL application 106, respectively.

In some embodiments, information in the UI 400 can include one or more hyperlinks that can take the user to other webpages to provide additional information regarding a test session. For example, session id may be in the form of a hyperlink or may include a hyperlink taking the user to a detailed session webpage that includes additional information about the session, such as text logs, network logs, more granulated time stamps. In some embodiments, the detailed session webpage can include a video clip of the screen of the terminal device 112. The user developer can replay the video clip to observe the screen output of the terminal device 112 during the test session. The hyperlinked elements of the UI 400 can reduce the number of steps a user/developer may have to take to obtain the information relevant to a test session.

Various errors and error types can be detected and indicated in the UI 400, without inspecting the traffic substantively. In some embodiments, low level TCP sockets can provide information that can successfully indicate origin and/or type of error, without the need to substantively inspect the payload in the traffic. In other words, the operator of the infrastructure 100 can extract error information useful to the operator and/or to the user developer, in terms of identifying origin and type of error, not from what is in the traffic, but from the routing data of the traffic. Example origins of an error can include user developer-side errors and the operator-side errors. Example of error types can include mismatched socket counts, tunneling connection errors, terminal device 112 configuration errors, user request to public servers' configuration and/or routing errors, DNS mapping errors, and local problems with user test network 102.

Mismatched Socket Counts

As described earlier, if the number of terminal sockets does not match the sum of repeater sockets and binary sockets, this can indicate that a number of test requests have been dropped somewhere in the process. A related case is when the terminal socket count is zero. This can indicate an error in a test session.

Figure 5:
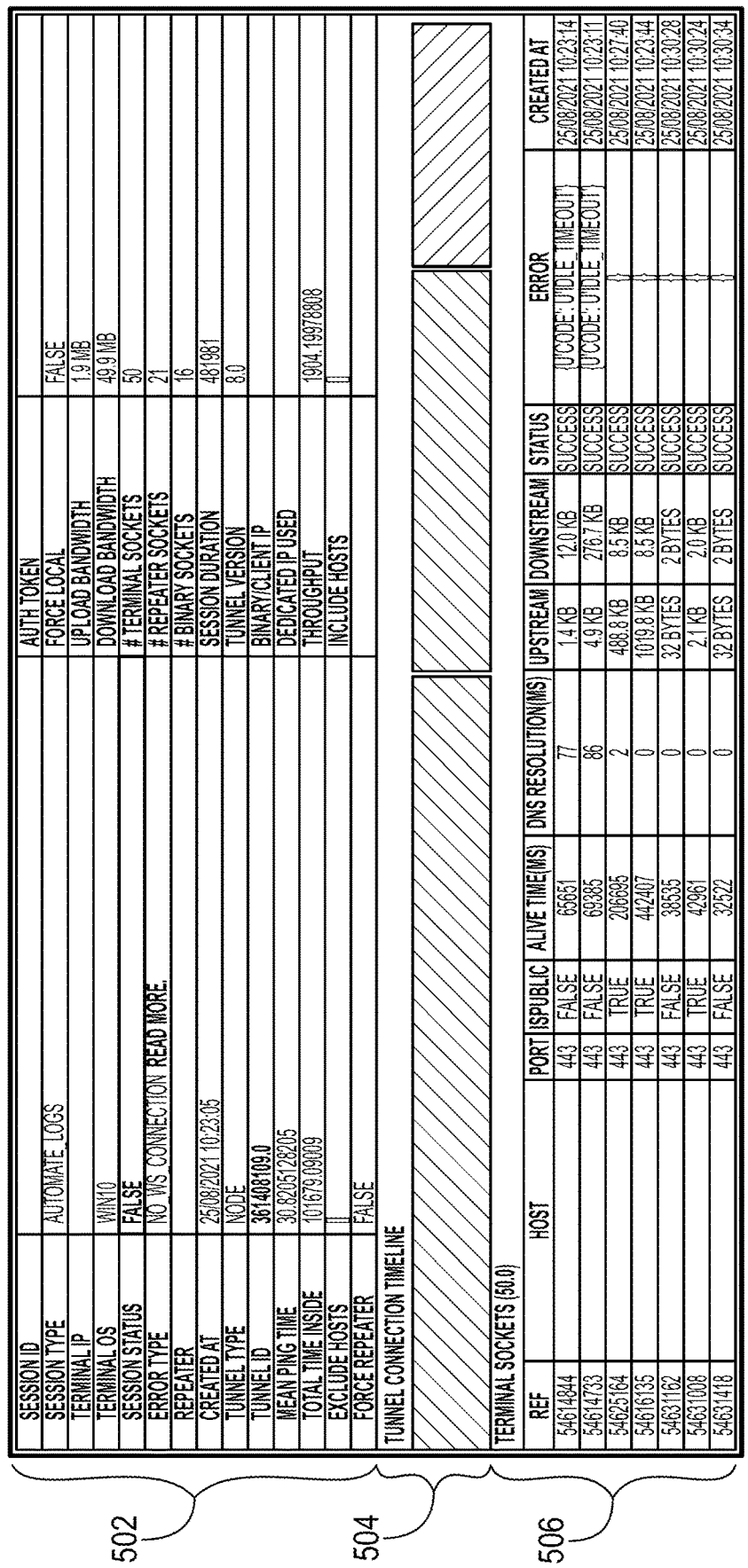
FIG. 5 illustrates another example of an excerpt of a user interface for visualizing a test sessions and errors therein.

FIG. 5 illustrates a UI 500 where a test session includes a mismatched socket count error. The UI 500 is similar to the UI 400 described above, but the test session data shown in the UI 500 indicates a socket mismatch error. Consequently, the session status field in the summary section 502 indicates "false" and can be highlighted. In the example of FIG. 5, the number of terminal sockets (50) does not match the sum of repeater sockets (21) and binary sockets (16). The timeline 504 section of the UI 500 indicates an interruption in the tunnel connection timeline. A portion of the terminal sockets listing 506 is visible in the excerpt of the UI 500 shown. A mismatched socket count error can further be investigated using the tunnel connection timeline 504, and socket listings and/or the data in the listings. The mismatched socket count error, as well as other errors described herein may be found to be related, where discovery of one error can lead to discovery of additional errors in different layers of the infrastructure 100.

Tunneling Connection Error

As described earlier, during an error free test session, the tunneling connection 108 is expected to be an always-ON connection. If the tunneling connection 108 is down or slow, the test requests during the OFF period may be dropped, which can potentially cause a socket mismatch error and/or other types of errors. In some embodiments, the repeater 110 can record the status of the tunneling connection 108 when routing a traffic request. Consequently, the status of the tunneling connection 108, corresponding to a traffic request can be determined.

FIG. 6 illustrates an example excerpt of a terminal sockets listing 606, where monitoring tunnel connection status, relative to each request, allows the user or the operator to efficiently identify errors related to tunnel connection interruptions. In the example shown, some requests are highlighted and indicated by an error status identifier, including a textual indication of the tunnel connection 108 status, during a test session. In addition to visually representing the tunnel connection status relative to traffic requests, the infrastructure 100 can also catalog this information in a backend database.

In addition to recording the status of the tunneling connection 108 in relation to a corresponding traffic request, the infrastructure 100 can record timing data related to the status of the tunneling connection 108. The timing and status data can be used by the user developer or the operator to identify and troubleshoot problems. An advantage of troubleshooting code, with data from the status and timing of tunneling connection is that software 103 may be of a kind that is supposed to be always ON when in actual deployment stage. Debugging, testing code and isolating issues may be difficult if the corresponding software and servers are in an always ON status requirement when deployed. The user developer can utilize the environment of the infrastructure 100 to take advantage of tunning connection data (status and timing) to isolate errors, debug and test, where the software and the corresponding servers are allowed be ON or OFF, depending on the testing requirement. In other words, the developer can determine, which ON/OFF events were commanded, and which were due to errors.

Some tunneling connection errors are due to temporary network failures, in one or more of the networks in the infrastructure 100. The infrastructure 100 can include redundancy protections, where a dropped or failed connection is reattempted according to a predefined protocol. Nonetheless, such tunneling connection errors can also be flagged and relayed to the user developer and/or the operator in a variety of formats.

Traffic Size Error

In some cases, a particular size of traffic is expected. The size of traffic dropping below some predefined thresholds can indicate an error in the test session. In the example shown in FIG. 6, the requests that occurred during tunnel connection OFF periods, indicate a downstream size of only 2 bytes, compared to other traffic being of much larger sizes (e.g., in the kilobytes). The size error of this kind can be visually identified by the operator or the user developer by inspecting the UI elements 400, 500 or it can be coded with appropriate thresholds defined by the user developer and/or the operator to flag errors based on the size of actual traffic versus the size of expected traffic.

Errors in Operator Side

In some cases, a test traffic request originated in software 103 is not mirrored in the terminal device 112. In other words, during a test session, a corresponding terminal socket to a user developer side test request may be missing. In this scenario, sometimes, a socket mismatch error may not be triggered, because for other requests that have been successfully mirrored, there may be a corresponding repeater or binary socket. In other cases, the request may have been mirrored in the terminal device 112, but a corresponding request from the terminal device 112 to the repeater 110 may be missing. As an example, a test request in the software 103 can be a request to access a URL on a public server 114. In the normal case, the mirroring operations of the REL application 106, tunneling connection 108 and repeater 110 generates the same URL request from the terminal device 112 to the repeater 110. If a corresponding terminal socket, for example, the same URL request from the terminal device 112 to the repeater 110 is not found, a mirroring error or a terminal socket error in the session exists.

In some embodiments, a mapping of the test requests in software 103 to corresponding terminal sockets can be recorded. If a test request in software 103 lacks a corresponding terminal socket, a mirroring error can be generated and shown in a UI. A mirroring error can be due to a misconfiguration of the terminal device 112 or other problems on the provider side. For example, the terminal device 112 may have failed and may need replacement on the provider side. In some embodiments, a mirroring error alert can be generated, and the provider can be alerted to troubleshoot the issue.

Errors in User Side

Conversely, the origin of an error may be on the user developer side. User code errors are dominant in a test environment and more expected in the infrastructure 100, as the user developer employs the infrastructure 100 for the purpose of testing, developing, and debugging the user code. Still, the operator can provide data on type and origin of some errors to the user developer, without inspecting the user traffic substantively. An example user side error can include user misconfiguring a request to a public server 112. In these instances, a corresponding terminal socket and a corresponding repeater socket can be detected for a misconfigured public server request, while no response or an error response from the public server 112 can be a resolution of a misconfigured public server request. In a misconfigured public server request scenario, a mirrored request has been sent from the terminal device 112 to the repeater 110 and the repeater 110 has forwarded the request to the public server 114, but an error in the request, as originally generated from the user has caused the public server 114 to reject the request. For example, a firewall of the public server 114 may reject a request that is not configured according to the format the public server 114 expects.

In some embodiments, a first DNS resolution stage occurs at the repeater layer, whereby the repeater 110 resolves a URL request to a public server 114, and if the repeater cannot resolve the request to a public server 114, it forwards the request to the REL application 106 to resolve in the user network 102. A second DNS resolution stage can occur at the user network 102. Accordingly, the user network 102 can include DNS resolution tables to route the received requests within the user test network 102, including for example by forwarding the requests to one or more user servers 104.

Some user side errors, which can be detected from the routing data of the traffic, can include errors related to socket level errors. Examples include no DNS entry or faulty DNS mapping causing the REL application 106 to not be able to resolve a forwarded request to any resource within the user test network 102. Example socket level errors include "ENOTFOUND" or "ECONNREFUSED." FIG. 7 illustrates binary sockets listing 700, where some requests are denoted and highlighted with ENOT FOUND error messages. Some socket level errors can indicate an issue in the user code or software 103, or in the setup of the user test network 102, and/or the DNS resolution tables defined by the user developer. In these scenarios, the error is not in the infrastructure 100. In effect, the infrastructure 100 is working as intended in these instances.

Identifying Error Patterns

The identified errors on the operator side or the user side can be aggregated across multiple users for a predefined period of time to impart insight into the operations and efficiency of the infrastructure 100. The aggregated error data across multiple users and multiple test sessions can reveal patterns that can help isolate issues within the infrastructure 100. For example, multiple tunneling connection failures at a repeater can indicate an issue with the repeater, including configuration issues, or hardware issues, which can be addressed by hardware or software approaches, including replacement. The same situation can occur for a terminal device 112, where a pattern of mirroring errors at a terminal device 112 can indicate a replacement may be needed. The aggregated error data can include one or more of the errors described above. Identifying patterns in the aggregated error data can help the operator obtain a health assessment of the infrastructure 100 from millions of test sessions provided in a given time period.

Figure 8:
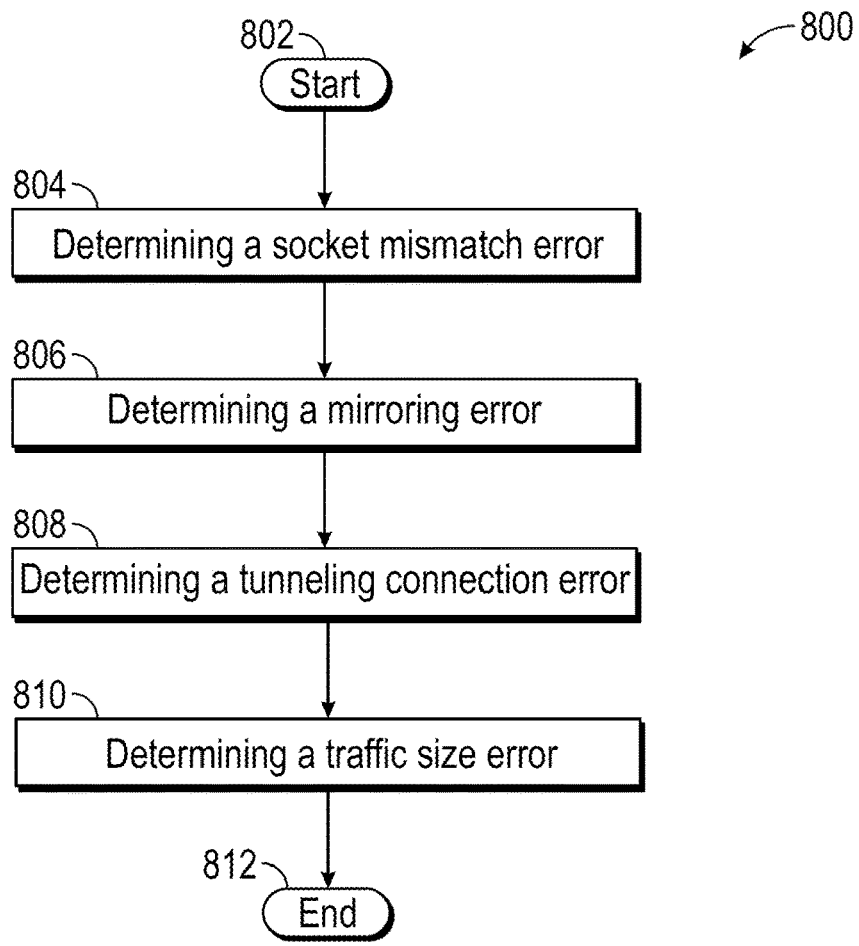
FIG. 8 illustrates a flowchart of a method for determining an operator-side test session error.

FIG. 8 illustrates a flowchart of a method 800 for determining an operator-side test session error. Depending on the error, one or more steps may be combined or eliminated. The method starts at step 802. At step 804, the method determines whether terminal sockets count equals the sum of repeater sockets and binary sockets. At step 806, the method determines, whether any user test request lacks a corresponding terminal socket. If yes, the method issues a mirroring error alert. At step 808, the method monitors the status of the tunneling connection 108 during the test session. When forwarding traffic, the repeater 110 can note the timing of the passage/forwarding of the traffic, as well as the status of the tunneling connection 108. If a request is dropped due to the tunneling connection 108 being OFF or slow, a tunneling connection error can be generated. At step 810, the method can monitor the size of the traffic and generate an alert if the traffic size is below an expected size. The method ends at step 812.

Figure 9:
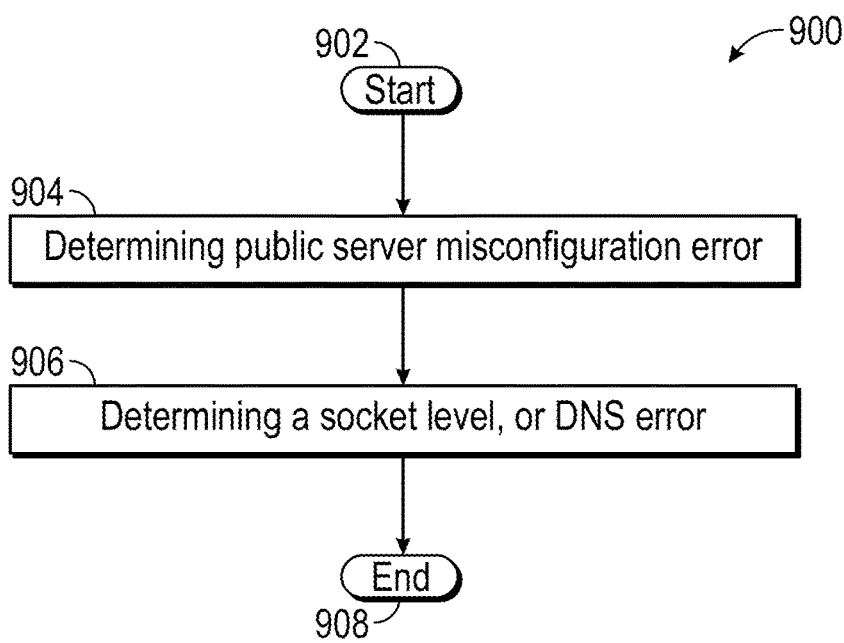
FIG. 9 illustrates a flowchart of a method for determining a user-side test session error.

FIG. 9 illustrates a flowchart of a method 900 for determining a user-side test session error. Depending on the error, one or more steps may be combined or eliminated. The method starts at step 902. At step 904, the method determines a public server request misconfiguration error if the public server request has a corresponding repeater socket, but no response from the public server or a rejection from the public server. The method can trigger a public server misconfiguration error. At step 906, the method determines a socket level error if a test request has generated corresponding terminal socket and REL application socket, but the request has not successfully routed through the internal resources of the user test network 102. The method can issue a socket level error, a DNS entry error or similar errors. The method ends at step 908.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
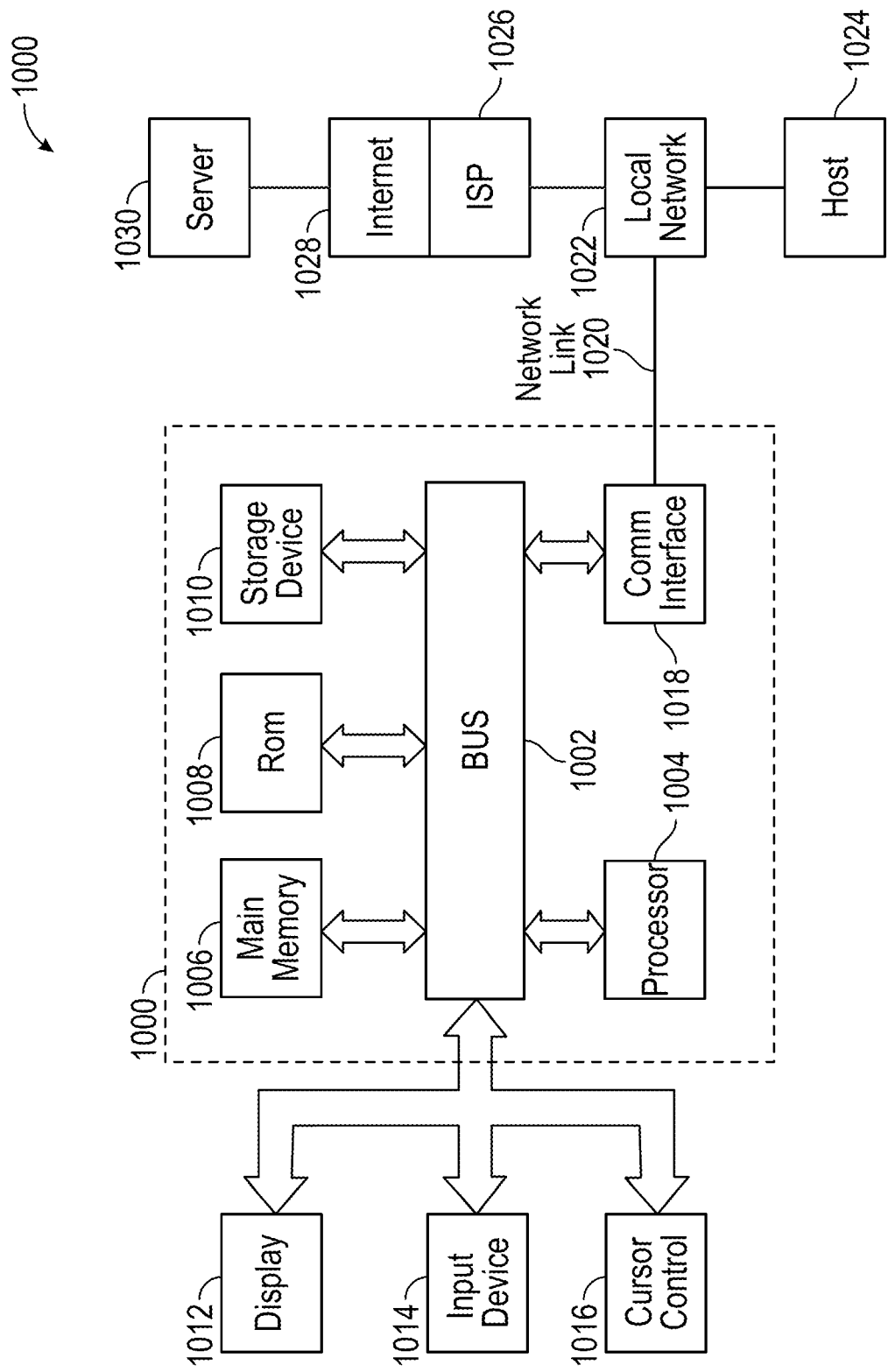
FIG. 10 illustrates an environment in which some embodiments may operate.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
providing a testing application, executable in a user network;
providing a device;
providing a repeater, connected to the testing application, the repeater configured to receive user application requests issued from the device;
determining, by the repeater, when the request comprises a request to access a public server;
routing the request, by the repeater, to the public server;
determining, by the repeater, when the request comprises a request to access a user server in the user network;
routing the request, by the repeater, to the testing application;
routing the request, by the testing application, to the user server in the user network; and
determining an error, conditions of the error comprising:
the request in the user application comprises a URL access request, and the request in the user application does not generate a corresponding request from the device to the repeater.

2. The method of claim 1, further comprising: determining an error in a test session based on an analysis of number of issued, received and/or routed requests.

3. The method of claim 1, wherein traffic requests from the device to the repeater comprise device sockets, traffic requests from the repeater to public servers comprise repeater sockets, and traffic requests from the testing application to the user server comprise testing application sockets and the method further comprises:
aggregating the device sockets, the repeater sockets and the testing application sockets;
determining a sum of the repeater sockets and the testing application sockets; and
determining an error in a test session by determining the sum of the repeater sockets and the testing application sockets not equaling the number of device sockets during the test session.

4. The method of claim 3, further comprising generating a dashboard comprising:
a summary of characteristics of the test session, comprising one or more of: numbers of device sockets, repeater sockets and testing application sockets;
a timeline of status of connections between two or more of the device, the repeater and the testing application;
URL requests in the device sockets;
URL requests in the repeater sockets; and
URL requests in the testing application sockets,
wherein dropped and/or unresolved URL requests are indicated in the dashboard.

5. The method of claim 1, further comprising:
monitoring connection between two or more of the device, the repeater and the testing application; and
recording the status of the connection when routing a request from the repeater.

6. The method of claim 1, further comprising determining an error in a test session based on the size of traffic corresponding to the request.

7. The method of claim 1, further comprising determining an error in the user application, conditions of the error in the user application, comprising:
the request in the user application comprises a URL access request to a public server, the repeater routes the URL access request to the public server, and the public server rejects the URL request.

8. The method of claim 1, further comprising determining an error in the user application, conditions of the error in the user application, comprising:
the request in the user application comprises a URL access request to a user server in the user network, the repeater routes the URL access request to the testing application, and the testing application is unable to resolve the URL request to a user server.

9. The method of claim 1, wherein the method is implemented in an infrastructure and the method further comprises:
determining a plurality of errors in a plurality of test sessions, each test session associated with a separate user, user application and user network;
identifying patterns in the plurality of errors, wherein the patterns indicate issues in the infrastructure and/or the user applications, wherein the errors comprise one or more of:
number of requests routed from the device to the repeater does not equal number of requests routed, by the repeater to the public server plus number of requests routed, by the testing application, to the user server in the user network;
user application requests not mirrored in the device;
interruptions in connection between one or more of the device, the repeater and the testing application;
unrouted requests at the repeater; and
unrouted requests at the testing application.

10. A system comprising a non-transitory computer storage that stores executable program instructions that, when executed by one or more computing devices, configure the one or more computing devices to perform operations comprising:
providing a testing application, executable in a user network;
providing a device;
providing a repeater connected to the testing application, the repeater configured to receive user application requests issued from the device;
determining, by the repeater, when the request comprises a request to access a public server;
routing the request, by the repeater, to the public server;
determining, by the repeater, when the request comprises a request to access a user server in the user network;
routing the request, by the repeater, to the testing application;
routing the request, by the testing application, to the user server in the user network; and
determining an error in the user application, conditions of the error in the user application, comprising:
the request in the user application comprises a URL access request to a public server, the repeater routes the URL access request to the public server, and the public server rejects the URL request.

11. The system of claim 10, wherein the operations further comprise: determining an error in a test session based on an analysis of number of issued, received and/or routed requests.

12. The system of claim 10, wherein traffic requests from the device to the repeater comprise device sockets, traffic requests from the repeater to public servers comprise repeater sockets, and traffic requests from the testing application to user servers comprise testing application sockets and the operations further comprise:

aggregating the device sockets, the repeater sockets and the testing application sockets;
determining a sum of the repeater sockets and the testing application sockets; and
determining an error in a test session by determining the sum of the repeater sockets and the testing application sockets not equaling the number of device sockets during the test session.

13. The system of claim 11, wherein the operations further comprise generating a dashboard comprising:
a summary of characteristics of the test session, comprising numbers of device sockets, repeater sockets and testing application sockets;
a timeline of status of connections between two or more of the device, the repeater and the testing application;
URL requests in the device sockets;
URL requests in the repeater sockets; and
URL requests in the testing application sockets,
wherein dropped and/or unresolved URL requests are indicated in the dashboard.

14. The system of claim 10, wherein the operations further comprise,
monitoring connection between two or more of the device, the repeater and the testing application; and
recording the status of the connection when routing a request from the repeater.

15. The system of claim 10, wherein the operations further comprise determining an error in a test session based on size of traffic corresponding to the request.

16. The system of claim 10, wherein the operations further comprise: determining an error, conditions of the error comprising:
the request in the user application comprises a URL access request, and the request in the user application does not generate a corresponding request from the device to the repeater.

17. The system of claim 10, wherein the operations further comprise determining an error in the user application, conditions of the error in the user application, comprising:
the request in the user application comprises a URL access request to a user server in the user network, the repeater routes the URL access request to the testing application, and the testing application is unable to resolve the URL request to a user server.

18. The system of claim 10, wherein the operations further comprise:
determining a plurality of errors in a plurality of test sessions, each test session associated with a separate user, user application and user network;
identifying patterns in the plurality of errors, wherein the patterns indicate issues in the system and/or the user applications, wherein the errors comprise one or more of:
number of requests routed from the device to the repeater does not equal number of requests routed, by the repeater to the public server plus number of requests routed, by the testing application, to the user server in the user network;
user application requests not mirrored in the device;
interruptions in connection between two or more of the device, the repeater and the testing application;
unrouted requests at the repeater; and
unrouted requests at the testing application.

* * * * *